United States Patent
Dmitriev

(10) Patent No.: US 7,293,260 B1
(45) Date of Patent: *Nov. 6, 2007

(54) CONFIGURING METHODS THAT ARE LIKELY TO BE EXECUTED FOR INSTRUMENT-BASED PROFILING AT APPLICATION RUN-TIME

(75) Inventor: Mikhail A. Dmitriev, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 858 days.

This patent is subject to a terminal disclaimer.

(21) Appl. No.: 10/671,648

(22) Filed: Sep. 26, 2003

(51) Int. Cl.
*G06F 9/44* (2006.01)
*G06F 9/45* (2006.01)

(52) U.S. Cl. ............ 717/130; 717/127; 717/151; 717/158; 717/154

(58) Field of Classification Search ............ 717/130, 717/127, 151, 158, 154
See application file for complete search history.

(56) References Cited

U.S. PATENT DOCUMENTS

| | | | |
|---|---|---|---|
| 6,170,083 B1 * | 1/2001 | Adl-Tabatabai | 717/158 |
| 6,202,205 B1 * | 3/2001 | Saboff et al. | 717/151 |
| 6,314,558 B1 * | 11/2001 | Angel et al. | 717/130 |
| 6,351,724 B1 | 2/2002 | Klassen et al. | 702/186 |
| 6,934,935 B1 * | 8/2005 | Bennett et al. | 717/130 |
| 7,194,732 B2 * | 3/2007 | Fisher et al. | 717/130 |
| 2003/0066055 A1 * | 4/2003 | Spivey | 717/131 |
| 2003/0131343 A1 * | 7/2003 | French et al. | 717/127 |

OTHER PUBLICATIONS

Berndl, et al, "Dynamic Profiling and Trace Cache Generation", 2003, IEEE, p. 276-285.*
Arnold, et al, "A Framework for Reducing the Cost of Instrumented Code", 2001, ACM, p. 168-179.*
Larus, James R. "Whole Program Paths", 1999, ACM, p. 259-269.*
"Oracle Call Interface Programmer's Guide," vols. 1 & 2, Release 8.0, Dec. 1997, http://alexander.pmf.ukim. edu.mk/oracledocs/appdev.804/a58234/title.htm.

* cited by examiner

*Primary Examiner*—Wei Zhen
*Assistant Examiner*—Qamrun Nahar
(74) *Attorney, Agent, or Firm*—Park, Vaughan & Fleming LLP; Edward J. Grundler

(57) ABSTRACT

One embodiment of the present invention provides a system that facilitates configuring selected methods for instrument-based profiling at run-time. The system first identifies a root method in a target application, wherein only methods that are reachable from the root method during execution of the target application are to be instrumented. The system then instruments the root method. Next, while subsequently executing a given instrumented method, the system determines if the given instrumented method is about to be executed for the first time. If so, the system instruments any methods that are called by the given instrumented method, are loaded, and have not been instrumented before.

30 Claims, 6 Drawing Sheets

```
public static void methodEntry(short methodId) {
    ThreadInfo ti = getThreadInfo();   // Get record for current thread
    if (ti != null && ti.inCallGraph) {
        if (ti.inProfilerRuntimeMethod) return;  // Avoid recursive instrumentation invocation
        ti.inProfilerRuntimeMethod = true;
        ti.stackDepth++;                         // Push the simulated stack pointer for this thread
        ti.stack[ti.stackDepth] = methodId;      // Set the simulated stack method invocation // ... Obtain current time and record the "method entry" event ti.inProfilingRuntimeMethod = false;
    } else if (methodId == rootMethodId) {   // Entered root method from outside this call graph
        ti.inProfilerRuntimeMethod = true;
        if (ti == null) {   // This thread never entered this call graph before
            ti = ThreadInfo.newThreadInfo();
            // ... Record the new profiled thread creation event
        }
        ti.inCallGraph = true;

// .... Perform other thread creation-related operations. Set the stack pointer.
        // ... Obtain the timestamp and record the "method entry" event
        ti.inProfilerRuntimeMethod = false;
    }
}
```

FIG. 4

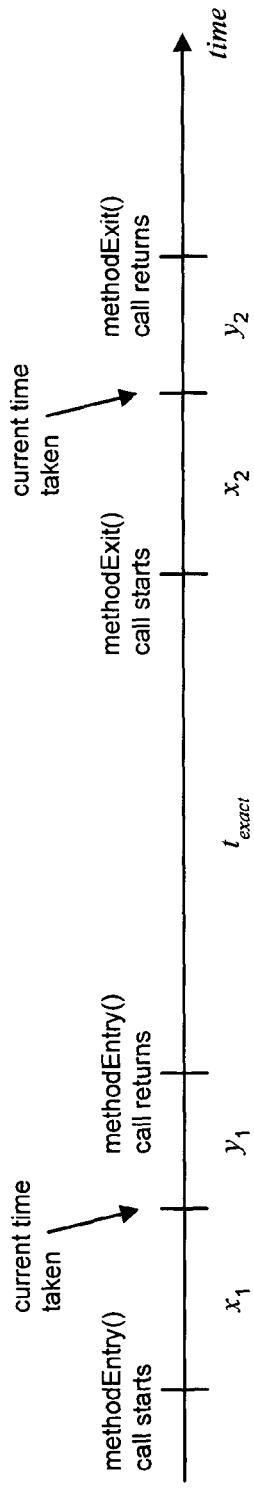

FIG. 5

CONFIGURING METHODS THAT ARE LIKELY TO BE EXECUTED FOR INSTRUMENT-BASED PROFILING AT APPLICATION RUN-TIME

RELATED APPLICATIONS

The subject matter of this application is related to the subject matter in a co-pending non-provisional application by the same inventors as the instant application entitled, "Dynamically Configuring Selected Methods for Instrument-Based Profiling at Application Run-Time," having Ser. No. 10/654,522, and a filing date of 2 Sep. 2003. The subject matter of this application is also related to the subject matter in a co-pending non-provisional application by the same inventors as the instant application entitled, "Method and Apparatus for Performing Time Measurements During Instrumentation-Based Profiling," having Ser. No. 10/666,515, and filing date 18 Sep. 2003.

BACKGROUND

1. Field of the Invention

The present invention relates to techniques for analyzing the performance of applications running on computer systems. More specifically, the present invention relates to a method and an apparatus for performing time measurements during instrumentation-based profiling.

2. Related Art

The growing size and complexity of modern software applications is increasing the demand for tools that automate the process of collecting data about the dynamic behavior of programs, thereby allowing developers to identify performance bottlenecks in their applications. The process of automatic collection and presentation of data characterizing performance of running programs is called "profiling." For an object-oriented language such as the JAVA™ (hereinafter "Java") programming language, that features automatic memory management, built in multithreading and thread synchronization mechanisms, etc., several forms of profiling are useful in practice. (Note that Java is a trademark or a registered trademark of Sun Microsystems Inc. in the United States and other countries.) They are distinguished by the type of data collected: CPU profiling determines how much time the program spends executing various parts of its code; memory profiling determines the number, types and lifetime of objects that the program allocates; monitor profiling determines congested monitors, etc. For applications built according to higher-level standards, for example Enterprise Java applications, specialized, high-level kinds of profiling exist, for example measuring the number of transactions passing through the system in a second.

Instrumentation-based profiling works by inserting, or injecting, special packets of code, called "instrumentation code," into the application to be profiled into a target application (TA). When the injected code executes, it generates events, such as method entry/exit or object allocation, that are recorded by the profiling system. The data, usually in the processed form (e.g., the total time spent in each method, or a total number of allocated objects of each type), is eventually presented to the user.

The main advantage of instrumentation-based profiling is flexibility. Virtually any kind of data, ranging from relatively low-level events such as those just described, to high-level data, such as the transaction's throughput, or the number and kinds of generated graphical user interface (GUI) events, can be obtained using this technique. For high-level data collection, and for object allocation profiling, there is no real alternative to instrumentation so far. For CPU performance measurements, the advantage of instrumentation compared to its main rival, sampling-based profiling, is that instrumentation records the exact number of events such as method invocations, and is capable of measuring precise time (not a statistical approximation, as it happens with sampling) spent in a given piece of code. Thus, instrumentation profiling has an advantage when it is required to profile a number of short-running and infrequently executed methods, for example those called in a GUI application in response to some user action. The fact that instrumentation records all events as they happen while the program runs, can help to restore the important details of program execution history, such as what methods a given method called and in what order, or a critical program path.

When we consider programs executed on top of a virtual machine (VM), as it is the case with the JAVA™ platform, we have to mention another alternative to code instrumentation: VM-generated events, or "VM hooks." The VM itself can be instrumented to generate events such as method entry/exit, object allocation, monitor enter, etc. This is done essentially by placing calls to user-suppliable functions in the relevant places in the VM code, for example in the interpreter code executed upon method entry. Some events that are important when profiling a Java application, for example a garbage collection event, cannot be generated using bytecode instrumentation at all. However, for most of the other events, in particular for method entry/exit and object allocation, it has been found over time that their support inside a JVM™ (hereinafter "JVM") complicates the latter, sometimes requiring a significant effort from developers, and at run time may cost more than equivalent bytecode instrumentation. (Note that JVM is a trademark or a registered trademark of Sun Microsystems, Inc. in the United States and other countries.) This is true at least for VMs intended to be used for general-purpose desktop and server applications, in contrast with those used in cell phones and smaller devices. As a result, it has been recently decided by the expert group established to define a new JVM profiling API, that in the forthcoming specification, many of the VM-generated events, including method entry/exit and object allocation, will be optional and not required to be supported by all conforming JVMs (see JSR 163—Java Platform Profiling Architecture, 2002). Bytecode instrumentation is the recommended mechanism for their generation.

However, despite the advantages of instrumentation listed above, for CPU performance measuring, instrumentation-based profiling generally does not work well. The problem is the high temporal overhead often associated with this technique. Injected instrumentation code takes its own time to execute; it may be executed very frequently, and its presence may prevent some optimizations, such as method inlining, which could have otherwise been made to the target application. For these reasons, total execution time overhead measured in "factors" rather than percent is not uncommon, and overheads in the range of 10,000 percent (100 times slower) have been reported.

Hence, what is needed is a method and an apparatus for performing time measurements during instrumentation-based profiling without the problems discussed above.

SUMMARY

One embodiment of the present invention provides a system that facilitates configuring selected methods for instrument-based profiling at run-time. The system first identifies a root method in a target application, wherein only methods that are reachable from the root method during execution of the target application are to be instrumented. The system then instruments the root method. Next, while subsequently executing a given instrumented method, the system determines if the given instrumented method is about to be executed for the first time. If so, the system instruments any methods that are called by the given instrumented method, are loaded, and have not been instrumented before.

In a variation on this embodiment, identifying the root method involves allowing a user to specify the root method.

In a variation on this embodiment, the system determines if the given instrumented method is about to be executed for the first time with the help of instrumentation code within the given instrumented method. This instrumentation code is executed whenever the given instrumented method is called, and is executed before any other instructions of the given instrumented method are executed.

In a variation on this embodiment, the instrumentation code checks a global "executed-once-or-more" flag associated with the given instrumented method. This flag is initially set to false. If the flag is false, the instrumentation code knows that the given instrumented method has not been called before, so it performs instrumentation operations, as necessary, and sets the flag to true. If the flag is true, the instrumentation code does not perform instrumentation operations.

In a variation on this embodiment, if a call to a virtual method is encountered in a given instrumented method that is about to be executed for the first time, the system additionally identifies a class for the virtual method based upon an object type associated with the call site, and then instruments methods corresponding to the virtual method in the identified class and in associated subclasses.

In a further variation, if the identified class does not have an implementation of the virtual method, the system additionally identifies a nearest superclass of the identified class that has an implementation of the virtual method.

In a variation on this embodiment, instrumenting a method involves dynamically patching the method while the target application is executing.

In a variation on this embodiment, instrumenting a method involves inserting profiling instrumentation code into the method, wherein the profiling instrumentation code includes method entry code that takes a first time measurement at the beginning of a method, and also includes method exit code that takes a second time measurement at the end of the method. Note that the first and second time measurements can be used to calculate an execution time for the method.

In a variation on this embodiment, the method entry code determines if the given instrumented method is about to be executed for the first time.

In a variation on this embodiment, the tasks of identifying methods and instrumenting methods are performed by a remote profiler client that communicates with a virtual machine executing the target application.

In a variation on this embodiment, code that makes up the target application includes platform-independent Java bytecodes.

BRIEF DESCRIPTION OF THE FIGURES

FIG. 4 illustrates the general structure of a method entry instrumentation method in accordance with an embodiment of the present invention.

FIG. 5 illustrates time distribution in an instrumented method in accordance with an embodiment of the present invention.

DETAILED DESCRIPTION

Figure 1:
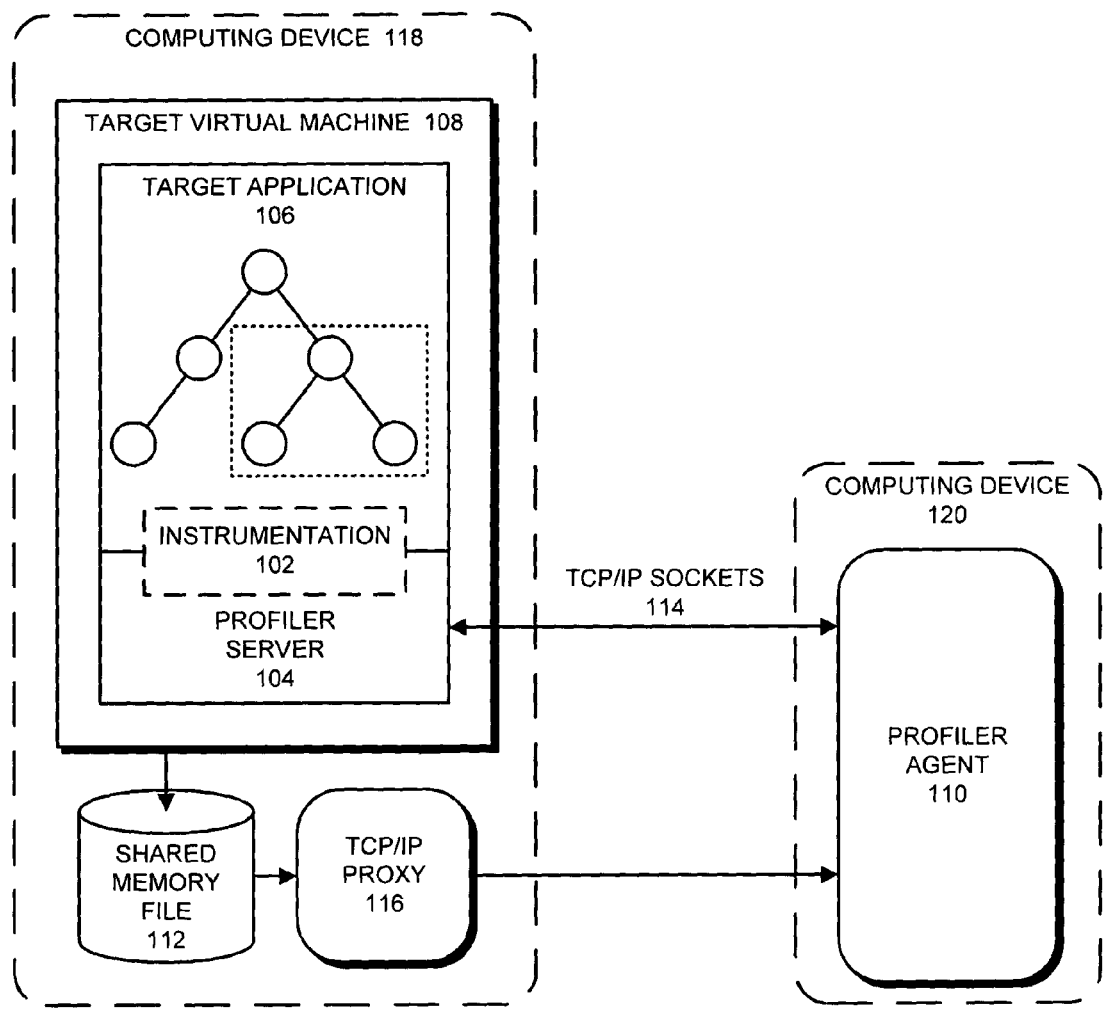
FIG. 1 illustrates how a target application is profiled in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

In this disclosure we describe a tool, called "JFluid", that address the above issues by allowing users to select and profile a limited subset of methods of a Java application, and do that as many times as needed while the application is running. The underlying mechanism enabling these features is dynamic bytecode instrumentation, which supports injecting (and removing) of instrumentation bytecodes into/from methods of a running program. It works in much the same way as the HotSwap mechanism, previously implemented by us and used by the "fix-and-continue" feature of debuggers. In the JFluid tool, the user can point at an arbitrary method m( ) in an application and invoke the "instrument selected method transitively" command. The system will instrument m( ), then reveal all methods called by m( ), transitively, and instrument them in turn. This technique is very easy to use, and, most important, seems to be the most appropriate for bottleneck profiling, since in most of the cases, a bottleneck can be defined as a single method or a single method plus all methods that it calls. This is in contrast with specifying all methods in a group individually or, say, as all methods in some class or package, as some other tools allow users to do.

One embodiment of the present invention includes a Java HotSpot™ that has been modified to support dynamic bytecode instrumentation, small profiling libraries that run in the target VM together with the target application, and the GUI tool. The system collects the profiling data in the form that allows it to present the CPU profiling results as a calling context tree. It also presents a sorted list of methods and the net accumulated time spent in each of them. Results can be obtained at any moment, without noticeable interruption to the running target application. At present, we collect only CPU profiling results, but certainly more data kinds will be added in future, revealing the full potential of this technology.

The modifications that we made to the HotSpot VM allow the user to start it without any special preparation (such as special command line options, presently needed in most of the industrial JVMs to enable various profiling-related capabilities), and then attach the tool to the VM at any moment, instrument the application and collect the data. This comes at a price of a slightly increased dynamic compilation time/application footprint, which we found negligible for long-running applications that are the main target of JFluid.

JFluid Architecture

Of the requirements to the design of an introspection system, an important one is to keep its impact on the target VM as little as possible, in terms of CPU cycles, heap space usage, and other internal resource consumption. On the other hand, ease of development, change, and maintenance is also important, especially for a research tool, where too often the initial idea and the final system differ quite significantly. The present architecture of JFluid is an attempt to address both of these requirements. In order to minimize the system's impact on the target VM 108, a client-server model was adopted for JFluid (see FIG. 1). The target VM 108 running on computing device 118 executes a profiler server 104, in addition to target application (TA) 106. A profiler agent 110 on computing device 120 communicates with profiler server 104 using TCP/IP sockets 114 and a shared-memory file 116 (why we use both of these mechanisms is explained a bit later).

Profiler server 104 (which is also referred to as a "backend") is a relatively small, but important part of JFluid, since its properties affect the performance and usability of the system to the greatest extent. Once activated, profiler server 104 starts a single thread that handles the communication with the profiler agent 110. It receives and executes the profiler agent 110's commands, and also informs profiler agent 110 of certain events that may occur while TA 106 is running. The injected instrumentation code 102 executes on behalf of TA 106, but structurally is also a part of profiler server 104. It collects and records the profiling data, and may trigger some events that are handled by the profiler server 104 and then, in some cases, by the profiler agent 110.

Unlike in many commercial tools, which seem to utilize only native C code in their backends, profiler server 104 can be written in Java, with only a small amount of C code. This code acts as a bridge between profiler server 104 and our special VM-internal API. This API provides a small number of calls to get VM internal information, such as all loaded classes or running threads, and handle some VM events, such as class loading. In addition, it provides the call to hotswap running methods. The rest of the server code is written in Java. That includes the code recording profiling events, which is called from instrumented methods, and the code responsible for communication between the server and the agent.

The advantages of the backend written in Java are clear: ease of development, increased portability, and even, possibly, a better performance of the instrumentation code. The latter is due to the fact that crossing the boundary between Java and native code is a relatively expensive operation. Thus, frequently executed instrumentation code written in Java and compiled with a sufficiently smart dynamic compiler, may execute even faster than the native code.

Writing the backend of an introspection tool in Java does not, however, seem to be a universally agreed approach, since, for one thing, the Java classes that belong to the tool, and the data structures that they create in the Java heap, inevitably distort the normal memory layout, and possibly the performance, of the TA. While this is generally true, we believe that for large applications that are the primary target of JFluid, the impact of this additional code and data is negligible.

To ensure that, we can take the following measures: (1) We can keep as much profiler code as possible at the agent side; (2) We can design the system in such a way that the size of the data generated by the server and kept at the target VM side remains limited during the TA execution lifetime; and (3) We can implement our wire protocol avoiding the use of Java object serialization (see below).

Another consideration is that, when judging whether Java code is appropriate, we should distinguish between the types of introspection tools. Specifically, in debuggers a backend written in Java would be problematic due to a high probability of deadlocks. They will most probably become an insurmountable problem, since both the backend and the TA would use Java threads and compete for the same VM internal resources, such as an internal class dictionary or various heap locks, while the backend would need to perform some VM internal functions, such as thread suspension, that a normal Java application can never use. In our profiling code, however, this does not appear to be a problem, since its interaction with the target VM internals is quite limited and is mostly in the form of queries. Thread suspension/resumption, although it is available, is used with care and only when explicitly requested by the user. Thus, there are no serious problems due to the JFluid server being written in Java, and the time spent on fixing occasional bugs in this area is fully compensated by the increased maintainability and other advantages of the Java code.

To transmit information between the agent and the server we use both a custom, packet-based wire protocol over TCP/IP sockets, and a shared memory file. While commands, responses, and the data that they carry (the amount of which is typically small) are transmitted using TCP/IP sockets, the acquired rough profiling data is transmitted using a shared memory file. This is due to the high volume of this data and the need to transmit it as fast as possible to minimize the runtime profiling overhead. The fact that we use both mechanisms (sockets and shared memory) is explained by the fact that we can extend our system such that the target VM and the agent can run on separate machines, as allowed in many other tools. In that case, TCP/IP sockets will be the only universal communication mechanism. However, to retain advantages of processing rough profiling data outside the target VM, we will still have a small "proxy"

component running on the same machine, that would get the rough data through the shared memory file, process it and send relatively compact results to the agent over the network.

To minimize the impact of the communication code written in Java on the target VM, we can implement our own custom mechanism of data transmission over TCP/IP sockets, which does not use standard Java Serialization. Commands of our wire protocol are mostly simple, each including a few integers and strings, or at most a few arrays of those, so it was not difficult to write essentially our own custom serialization code. This helped us to avoid "polluting" the Java heap with many additional classes that are loaded and even automatically generated by the standard Java Serialization mechanism. The performance of our mechanism is also superior to that of the Java Serialization. Finally, the JFluid agent is a Java application taking advantage of automatic memory management, portable graphics libraries used for data presentation, and other advantages of the Java platform. It can either start the target VM or attach to an already running one. As the TA executes, the agent processes the rough profiling data generated by the server and builds a compact and informative representation of profiling results (this is described in following sections).

Establishing Connection with the Target VM

As most of other profiling tools, JFluid can work with the target VM/application in two modes: controlled application startup and attaching to a running VM. Both of these modes have their advantages and disadvantages, but obviously, the first one is much easier to implement. In our implementation, controlled execution of an application with main class AppMain works as follows. The JFluid agent starts the target JVM with its own ProfilerServer main class, passing it in the command line the AppMain name, class path and other execution parameters for the target application. It also passes the number of the communication port for server-agent communication, and the additional class path entries, so that the target VM can locate and load the JFluid server classes. The ProfilerServer class's main method starts and then spawns a thread that establishes a connection with the agent and keeps listening on the communication port. Once the connection is established, the main server thread starts the main method of AppMain class.

Attaching to a running application can be done in much the same way, i.e. by starting the target VM with a special main class. In the contemporary commercial tools it is actually done in a slightly different form, though: the target JVM is usually started with just one additional parameter, the JVM option "-Xrun<proflib>", where proflib is the name of a special native library. Given the above option, the JVM would load this library and call a function with a predefined name from it, before it executes any Java code, even loading and initialization of the most important core classes such as ClassLoader, Thread, etc. In this way, the native library can, for example, instrument Java core classes that are loaded at startup time, and start a native listener thread. With contemporary JVMs that do not support method hotswapping, this is the only way to enable late attachment of an introspection tool to the running VM and collect the same profiling information as available in controlled startup mode. In fact, it can be viewed as just a variation of controlled startup.

This mechanism, however, has a disadvantage: a VM should be started with special command line options to enable introspection. If this has not been done, introspection is unavailable. But the VM with instrumentation will typically run slower than normally, and the fact that it is e.g. constantly listening to some communication port may introduce security concerns. These are the main reasons why introspection of VMs running in production mode, while demanded highly, has not yet been widely adopted. A method hotswapping capability in the VM is ideally suitable to address the problem of early instrumentation leading to degraded performance. We can instrument and de-instrument any method in any way at any time, and thus can control the degradation in severity and time.

However, the problem of how to activate the introspection backend at any time in any VM (that is, in a VM not started with any special startup options) still remains. To address it, we came up with a solution. To activate the introspection backend (in fact, this mechanism can be used for any other code as well) we can use an operating system (OS) signal handler in the VM. An OS signal in UNIX™ does not carry any additional information with it, so in order to make this mechanism flexible enough, we suggest to use a convention, according to which, once the VM receives a predefined OS signal, it goes to the file system directory from which it was started and looks for a file with a predefined name. If the file is not there, nothing happens. If the file is there (normally it is the tool's responsibility to generate it, and then delete), it should contain the full path to the native library to start, and any parameters to the function (with the predefined name, the same convention as with -Xrun) that is its entry point. The VM then would load the library and start the function with the given parameters in a specially created thread.

Implementation of this mechanism is not difficult. The HotSpot VM already has some signal handlers. One of them, for the UNIX signal SIGQUIT, can also be activated by pressing Ctrl-\ (on Solaris) or Ctrl-Break (on Windows) on the keyboard. This signal handler presently dumps the stacks of all Java threads currently running in the VM. We can reuse this signal handler, adding a code to it that would, after dumping threads, look for a file and perform other operations as described above.

With this capability in our modified HotSpot VM, the tool can attach to a running VM at any moment by generating an introspection startup file and then sending the VM the above OS signal. The user has to specify only the process ID for the VM that they want to introspect, and its startup directory, which is usually easy to retrieve. This mechanism is fully secure, since on UNIX only the user who started it or a super-user can send any signal to a running application. The signal can travel only within a machine, and furthermore, the directory from which the VM has been started can be write-protected.

Method Instrumentation and Hotswapping

General Approach

The capability to instrument and de-instrument methods on-the-fly is a feature of the JFluid technology. At the time when the JFluid project started, the dynamic class redefinition capability, implemented in the form of the RedefineClasses( ) call in JVMDI, was already in place. However, it appears that the general class redefinition functionality provided by this call is technically not quite suitable for massive, yet individually small changes to methods that characterize bytecode instrumentation. RedefineClasses( ) takes the arguments that are, essentially, the pointer to the "old" class object, and the byte array representing the whole "new" class file. Before actually hotswapping the two classes, it parses the class file, installs an internal class object for the new class version, compares the two versions to make sure that only supported changes have been made in the new version, etc. These operations are rather time and memory-consuming, and it is clear that they can be omitted if it is known in advance that modifications that we are going to apply are, for example injection of method calls into existing bytecodes, or, generally, any modifications that obey certain technical restrictions.

Given the way in which classes are represented in memory in the HotSpot JVM, and other properties of this system, these restrictions look like:

1. Nothing in a class except the code of existing methods is modified. This saves us a lot of run time work needed to restructure the internal class object if, for example, a method or a data field is added.
2. No existing constant pool entries are changed or removed, and the same constant pool entry index x in the original and the instrumented method code refers to the same constant value. This saves us time parsing the whole new constant pool, and also guarantees that both old and new method versions can operate on the same new constant pool.

Given that the instrumented code satisfies the above conditions, dynamic bytecode instrumentation can be implemented in a number of ways that differ in how the work is divided between the tool and the VM-internal mechanisms. In one extreme approach, the VM knows everything about the instrumentation and does all the code injection and hotswapping work. The API that is provided by this mechanism would look essentially like InstrumentMethod(methodId) and DeinsturmentMethod(methodId).

As an opposite extreme approach, the agent is responsible for supplying the new method bytecode (and additional constant pool contents, if needed), and the VM performs only method installation and hotswapping. The API for this approach would look like RedefineMethod (methodId, byte [ ] newMethodCode) and ExtendConstantPool (classId, byte[ ] addContents). Both approaches have advantages and disadvantages. An advantage of the "VM knows it all" approach is that, once implemented, it is very easy to use, and is also likely to be faster, since the VM may optimize some internal operations and avoid others (e.g. consistency checks for the instrumented code) due to its knowledge of what code to inject and where. A disadvantage is the lack of flexibility: it is impossible to provide support for all imaginable instrumentation schemes within the VM, and even support for a limited number of what seems to be most useful schemes may require a significant amount of code that will increase maintenance costs and probability of bugs. The advantages and disadvantages of the other approach are exactly the opposite: maximum flexibility, but also maximum implementation work in the tool, and potentially worse performance.

In an implementation of bytecode instrumentation suitable for wide use it may be preferable to follow the second approach. However, for our initial implementation we initially chose the first approach. The main reason was pure engineering considerations—we wanted to save implementation time and reduce complexity. That was possible, since HotSpot already contains some internal code that can be easily adapted to support method bytecode rewriting when additional instructions are injected into a method. Also, when the VM itself performs instrumentation, smaller amounts of data are exchanged between it and the agent, and fewer problematic situations can arise. On the other hand, the code for method bytecode processing and installation in the VM, that we need to reuse if we follow the second approach, is currently tightly coupled with other class loading/parsing code, and it is not straightforward to factor it out and adapt for our purposes. Furthermore, we would have to implement bytecode instrumentation at the agent side. For all these reasons, the bytecode instrumentation API in our modified JVM currently includes a few calls that look essentially like InstrumentMethod( ), InstrumentMethodGroup( ), and DeinstrumentMethods( ).

Dealing with Compiled and Inlined Code

Technically, runtime hotswapping of a method is not such a challenging issue as it might seem. The task is simplified by the fact that our current policy for switching between the original and the instrumented method version is "all active invocations of the original method complete as is, and all calls to this method that happen after hotswapping go to the instrumented method version." In other words, if a method that we want to instrument is currently running, we don't attempt to switch execution to the instrumented code immediately. The latter feature does not currently seem to be very valuable in practice, since methods that never exit (for example because they spin in an endless cycle) are rare and can be addressed separately if needed. Also, if immediate switching is performed, the instrumented code would generate a number of "method exit" events that are not matched with corresponding "method entry" ones.

Given this policy, method hotswapping means essentially locating all pointers to old method versions and switching them to the respective new method versions everywhere in the program. However, this is a real challenge in a VM, such as the HotSpot VM, that runs Java applications in mixed mode, when initially the program is interpreted, and gradually the most actively used methods are compiled into native machine code. One compiled method can call another using a direct call machine instruction; furthermore, some methods may get inlined into their callers. In the latest versions of HotSpot, inlining is performed aggressively, which means, in particular, that virtual methods can be inlined if, at compile time, only a single method implementation can be called from a particular call site.

These properties could significantly complicate the implementation of method hotswapping, since locating and switching pointers to methods in the internal mixed representation of a Java application would become really non-trivial. Fortunately, the so-called deoptimization mechanism that solves this problem is already available in HotSpot. Initially this mechanism was implemented to enable aggressive inlining of virtual methods: we can inline a virtual method m( ) if there are presently no loaded subclasses of its class which override m( ). When inlining is performed, the information about the method that inlines another one at such (potentially polymorphic) call site, called method dependency, in the form of a "caller-callee" pair, is recorded. If later a subclass that overrides m( ) is loaded, the VM immediately switches to interpretation of all methods that used to inline m( ) (deoptimizes them). Later deoptimized methods may be recompiled. Deoptimization in HotSpot happens in two phases. On the first, eager phase, the execution is suspended, the stacks of all application threads are scanned, and all compiled stack frames for methods that should be de-optimized are patched in a special way. The execution is then resumed, and the second phase happens when a callee method is about to return to the method that got de-optimized, say m( ). At that time, the stack frame of m( ), which is now the topmost, is converted into the format of the interpreter, and the current instruction pointer is set to the point in the byte code that corresponds to the current point in the machine code. The procedure is complicated by the fact that m( ) itself, and possibly its callers, may be inlined, thus a single native stack frame may be replaced with several interpreted stack frames at once.

Method dependency recording is crucial for being able to perform deoptimization. There is, however, one caveat: it can be done differently depending on what it is going to be used for. Specifically, if deoptimization information is needed only to support virtual method inlining, there is no need to record dependencies on static, private, and final Java methods, for which no overriding can happen. If, on the other hand, we want to hotswap methods at run time, we need to record dependency information for all methods, including static and others. This is actually done in the current product HotSpot VM when it runs in the "debug" mode. This mode does not preclude dynamic compilation, yet enables setting breakpoints in, and evolving, compiled methods at run time.

However, full dependency recording comes at a price, especially in short-running programs, where compilation may take a noticeable part of execution time. In one implementation, we observed the total execution time overhead as high as 10 percent for some programs in our informal tests when full dependency recording was turned on. This is too high a price to pay for a feature that is not going to be used in such programs most of the time. On the other hand, for long-running programs the slightly increased compilation time does not make a noticeable difference.

Taking these considerations into account, we can adopt a solution that, we believe, should satisfy users most of the time. It takes advantage of the fact that there are actually two dynamic compilers in the HotSpot VM: the client compiler (C1), and the server compiler (C2). Only one compiler can be chosen, using a command line option, at the VM start up time, and cannot be changed later. The compilers differ in the compilation speed, degree of optimization used in the final machine code, and the memory footprint. The combination of these properties makes C1 more suitable for relatively small and short-running applications and C2 for large and long-running applications.

In one embodiment of the present invention, full dependency recording is turned on by default in the server compiler, C2, and off in the client compiler, C1. If the user wants to profile an application using C1 and starting it from within the JFluid tool (as happens for short-running applications most of the time), the tool automatically launches the target VM with a command line option that enables full dependency recording. If, in a relatively rare case, the user wants to attach to a running VM that uses C1, the JFluid server code will automatically invoke deoptimization of all compiled methods in the program before performing the first method hotswapping operation. This will cause a temporary execution slowdown, which, however, will be relatively brief, since the compiler will quickly recompile the "hot" application methods.

Instrumentation Procedure

The main API call that we use for method instrumentation takes the array of classes and for each of them an array of method IDs to be instrumented (actually, a single packed array of method IDs is used). The actual procedure of replacing methods with their instrumentation copies includes the following two phases.

In the first phase, the system creates a method copy and injects the instrumentation into it. This operation is performed in an ordinary Java thread, without suspending other application threads, and therefore causes minimal slowdown, especially if the VM runs on a multiprocessor machine.

Figure 2:
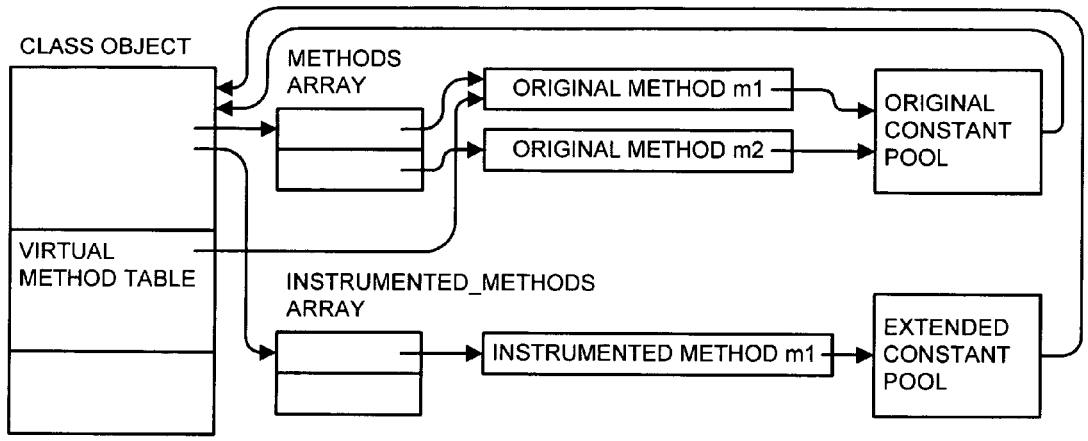
FIG. 2 illustrates class and method objects after instrumented methods are created in accordance with an embodiment of the present invention.

A new internal method object is created for each method scheduled for instrumentation, and then the VM internal bytecode rewriting code is used to create "holes" in the bytecode copy, possibly re-computing jump operations that cross these holes. Then we fill in the holes with calls to our methodEntry( ), methodExit( ), etc. methods (see the next section). Since calls in Java bytecodes go via constant pool references, we have to check the constant pool for existing references to the injected instrumentation methods. If there are none, we create a new, extended constant pool object with added method references, and attach it to the instrumented method version to prevent it from being garbage collected. The instrumented method copy is, in turn, attached to its class object, using a special instrumented methods array that we introduced, which is similar to the standard methods array holding references from the class to its methods. This is illustrated in FIG. 2, where it is shown what happens if one of two class's methods, m1( ), is instrumented.

Figure 3:
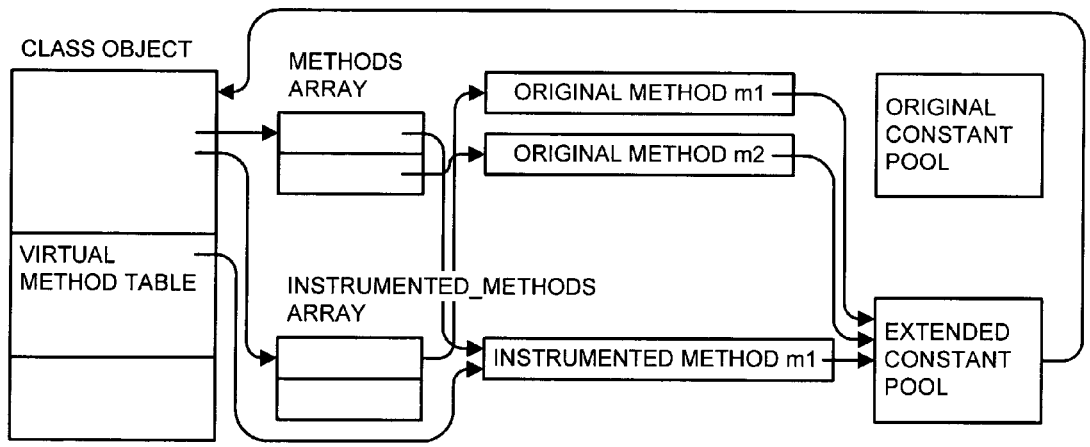
FIG. 3 illustrates class and method objects after instrumented methods are activated in accordance with an embodiment of the present invention.

In the second phase, the system activates the instrumented code. Once the previous operation is performed for all methods scheduled for instrumentation, we suspend all application threads, bringing them to the safe point. Then we deoptimize all methods depending on our instrumented methods. Finally, we switch pointers from original methods to instrumented ones everywhere in the JVM. This includes constant pool caches of any classes that call these methods, and also virtual method tables of a class that defines an instrumented virtual method, and its subclasses (a constant pool cache is a special data structure used internally in HotSpot alongside the standard Java constant pool to speed up method call and field access operations). Finally, we scan the stacks of all application threads, and switch pointers from stack frames to constant pool cache, so that they point to our new, extended constant pool cache, created on the previous phase. The old constant pool and cache are not referenced from anywhere after that, and eventually get garbage collected. However, the original method versions are preserved in the same instrumented_methods array, to facilitate de-instrumentation of methods, if needed later. This is illustrated in FIG. 3.

After the second operation is complete, the application threads are resumed, and the next call the target application makes to an instrumented method, goes to its new version. The invocations of original method versions that are currently active complete as is.

Data Collection and Transmission

JFluid can collect of two kinds of profiling data. The first, more sophisticated kind (which, however, imposes a much higher runtime CPU overhead) is a Context Call Tree (CCT) plus a sorted list of accumulated net times for individual methods, which are built for a call subgraph of the TA. The second kind of profiling data (collecting which imposes virtually no overhead) is gross time for a single code region. In the following discussion, we will only cover various aspects of how instrumentation and other parts of the JFluid system support call subgraph profiling.

Instrumentation that is injected into each TA method that belongs to the call subgraph (see below for an explanation of how these methods are identified) consists of calls to at least the following two methods:

methodEntry(char methodId) and methodExit(char methodId).

Both of them are public static void methods, defined in our own ProfilerRuntime class. This class is placed in a special location on the class path, so that the target VM loads it using the bootstrap class loader. This way we ensure that there will be no problem with resolving this class and hence calling our instrumentation methods from any class loaded by the target VM, including the bootstrap classes. Each instrumented method of the TA is assigned its own integer identifier, which is hard-coded into the call to instrumentation methods.

The code of instrumentation methods themselves is not very simple, since, in addition to their main responsibility—taking the current timestamp and recording the relevant event—these methods need to perform a number of other operations necessary for correct data collection. The main reasons why these additional operations are needed are:

1. A limited subset of the TA methods is profiled, but any method that is within a call subgraph can also be called from a site which is outside this subgraph. Therefore, the instrumentation has to detect whether it is called in the profiled subgraph context or not, and in the latter case has to return as quickly as possible.
2. Instrumentation itself may call some Java library code, which also may be instrumented. We need to prevent recursive instrumentation calls, to avoid infinite recursion, misleading measurements, and other problems, such as deadlocking.
3. The TA code may throw exceptions, which would result in methodEntry( ) calls with no matching methodExit( )
4. In order to measure exact elapsed time for TA methods, we need to guarantee that each invocation of methodEntry( ) and methodExit( ) takes a constant amount of time, and/or that any deviations from this constant time can be predicted and measured in turn, to be compensated in the data presented to the user. In the following subsections, we discuss how each of these issues in turn is addressed in JFluid.

Context Sensitive Activation of Instrumentation

As we explained above, the instrumentation methods should emit their respective events only if they are called in the proper context: when the TA method that calls instrumentation is called from within the profiled subgraph, i.e. directly or transitively by the subgraph root method; and not recursively by any instrumentation method. To achieve this goal, as well as others, formulated above, we maintain a special data structure in the JFluid server—a hash table, that maps each TA thread that ever entered our call subgraph, to a record called ThreadInfo. Essentially, a ThreadInfo is a thread-local data structure associated with each thread. In ThreadInfo there are, in particular, two Boolean fields called in CallGraph and inProfilerRuntimeMethod. Both of them are initially set to false. They are further used in the instrumentation code as shown in FIG. 4, where the relevant parts of the methodEntry( ) method are presented. The comments in the code make clear how these flags are utilized. The structure of methodExit( ) method is largely the same, except that, after determining that we are inside the call graph, we first check if the logical stack depth is zero. If so, it means that we are in the topmost invocation of the root method, and thus will leave the call graph when this invocation completes. Therefore if ti.stackDepth == 0, we set the inCallGraph flag to false before leaving methodExit( ).

In each thread we maintain a simulated stack in the form of array of method IDs and a top stack frame pointer (stackDepth). This stack is needed to handle exceptions properly, as explained in the next section.

Exception Handling

If an instrumented method throws an exception, or receives one from some method and does not catch it, the instrumented method exits abruptly, without executing its methodExit( ) call. Consequently, if no measures are taken, we will get a number of method entry events not matched with corresponding method exit events. This will lead to losing the correct invocation context. That is, we will not know how many method invocations were exited before the exception was caught, and therefore when the next methodEntry( ) is called, we will not know where the corresponding method was called from. One way to fix this problem could be, for example, to sacrifice some performance and change methodEntry( ) so that it accepts two arguments: caller method ID and callee method ID (currently it takes only the latter). However, in this case upon method invocation we will still not know the exact stack depth. Thus in a situation when there is a recursive call chain such as x( )→y( )→x( )→y( ), the topmost y( ) throws an exception that is caught in some invocation of x( ), and then y( ) is invoked again, we will not know whether the stack now looks the same as above, or just as x( )→y( ).

In order to resolve this issue correctly, we instrument each catch block in methods of our call subgraph, by injecting into it a special handleCatch( ) method. Additionally, one try . . . catch block that covers the whole method body and catches and then re-throws all possible exceptions, is added to the root method to prevent undetected leave from the call subgraph. The fact that the handleCatch( ) method is called means that the exception is caught. handleCatch( ) determines its caller's location on the stack, and hence all method invocations that exited abruptly. It then emits method exit events for all these methods.

To determine the caller method's location on the stack, we, obviously, need access to the real Java stack, as opposed to our simulated stack that we maintain by means of ThreadInfo.stack and ThreadInfo.stackDepth variables. Once we have the real stack, we can match it with the simulated one to determine the common part, and then adjust the simulated stack by removing its excess part. It appears that matching two stacks is not as simple as just comparing their depths. The problem is due to the fact that we may have some methods on the real stack that are not on the simulated stack, because these methods were not instrumented. These may be, for example, Java core class methods that are deliberately left uninstrumented to reduce the profiling overhead, or native methods (so far we do not instrument such methods, though collecting profile data for them may be possible by instrumenting call sites for these methods, rather then their own code.) For this reason, we need to compare the actual names and signatures of methods on both of the stacks, starting from the root method. That is why we maintain not just the simulated stack depth, but also the stack itself (ThreadInfo.stack), as an array of method IDs, which, in turn, allow us to determine the names of methods on the simulated stack.

The matching procedure works as follows. We have the "current pointer" for each of the stacks initially pointing at the root method. Each live method invocation on the simulated stack should necessarily be on the real stack. Therefore, we advance the pointer on the simulated stack by one, and then advance the pointer on the real stack until a method with the same name and signature is found. If the real stack pointer gets beyond the topmost invocation, it means that the simulated stack pointer points to the topmost method that exited abruptly.

To get the real Java stack, we could use some JVMDI functions (there is no support for this in the Java Reflection API, unfortunately). However, the resulting C code would be rather cumbersome if the whole procedure is implemented in C, or even if just the intermediate results (the reals stack layout) is returned back to Java. For this reason, we used a pure Java mechanism, looking like:

Throwable t = new Throwable( );
StackTraceElement stack[ ] = t.getStackTrace( );

Essentially, using the above code we get the full Java stack, with method classes and names, at the point where new Throwable( ) is invoked. The reader is referred to the Java online documentation for the specification of the above classes and API. It is worth noting that the above code, that performs unwinding of the stack where many or all frames may correspond to methods compiled into native code, and some may be inlined, is relatively slow. To compensate for that, we record the time spent in this code and the subsequent stack matching procedure, and then issue the "adjust time" event (see the next section), so that in our presented profiling results the time spent in stack analysis effectively disappears.

On rare occasions the handleCatch( ) mechanism may not work properly in our system. That happens if an exception is thrown in an instrumented method and then caught in an uninstrumented or native method, before reaching any method containing handleCatch( ). To deal with this situation, the methodExit( ) method also contains a check that verifies if the method ID passed to methodExit( ) and the method ID on the top of the stack are the same. If a mismatch is detected, the same mechanism of real and simulated stack matching is used to determine the actual current location on the stack.

Recording and Transmitting Profiling Data

Collecting profiling data in a running Java application, when the instrumentation code itself is written in Java, presents a number of challenges due to the following requirements that we impose: (1) Profiling data should be available for presentation at any moment, so that we can monitor the performance of an application as it runs; (2) Data collection should cause as little overhead as possible; (3) The collected data should not take a noticeable part of the JVM heap, and, ideally, should be of small constant size; (4) If the data is dumped on disk, it should also take a relatively small and, ideally, constant space; and (5) Invocation of each instrumentation method should take a constant amount of time, and/or if a deviation happens, it should be detected and measured to be compensated for in the presented results (see the next section where this requirement is explained).

In the light of all these requirements, none of the traditional simple solutions would work. For example, writing each event into a file as it happens, or storing each event into a memory buffer and dumping it periodically into a file would involve a performance penalty and may create large (up to tens of gigabytes) files for call-intensive applications running for long periods. An alternative solution, which seems to be used by some commercial tools is to process the data at the target VM side and keep only the final compact representation (a CCT, as in our case) permanently. We initially implemented this solution, but unfortunately, for realistic applications even the compact representation of the profiling data may grow to a considerable size. For example, in one of our tests, a run of the javac Java compiler compiling a relatively small (a few thousand lines) Java application caused more than 3 million method invocations, and the resulting CCT appeared to contain several thousand nodes and occupied more than 3 MB in the Java heap. Not only was the heap image polluted by the node objects, but also additional, unpredictable delays in execution were caused by creation and garbage collection of all objects allocated and thrown away while the CCT was being built. Some tools seem to avoid at least the heap pollution problem by building the CCT in the C memory using the native C code. We, however, are looking for a completely portable solution, and also want to avoid additional overhead due to making native calls. Another consideration is that, although at this time we present only the CCT to the user, in future we may want to add more metrics, and therefore processing data "on line" on the target VM side may become much more problematic.

One solution that seems to satisfy all of the above requirements is a combination of rough data collection and dumping, and its online processing. Unlike the traditional solutions described above, it has a minimum performance and space penalty. To store the data as it is generated we can use a relatively small (1 MB in our case) byte buffer allocated in the Java heap. This object, although it distorts the heap image to a certain extent, does not affect the garbage collection time significantly (the generational garbage collector used in the HotSpot VM is likely to promote this object into the old generation soon, and pay little if any attention to it afterwards). Each call to methodEntry( ) and other instrumentation methods stores a corresponding event into this buffer. For example, for the method entry event it is a one-byte event code, two-byte thread identifier, and an eight-byte timestamp. If the event recording code discovers that a buffer is full, it remembers the current time (let us call it $time_0$), and then invokes the hook (described below), which dumps this buffer and notifies the agent that it can process the data. The server then waits for the agent that processes the data and notifies the server when it is finished.

Upon return from the hook, the current time ($time_1$) is taken again, and the special "adjust time" event is recorded, with the argument equal to $time_1 - time_0$. Such a mechanism, by avoiding any operations that may take noticeably varying and unpredictable amount of time, ensures that the execution time for methodEntry( ), methodExit( ) and other instrumentation methods is constant, and possible deviations are recorded and handled properly. That is, the code that processes the rough profiling data at the client side subtracts the "adjust time" event argument from the elapsed time for the current TA method, and from that for the whole subgraph.

To speed up transmission of rough profiling data to the agent, we dump the above buffer into a shared-memory file (using the API defined in the java.nio.MappedByteBuffer class). On Solaris and Windows, this works much faster than writing and reading an ordinary file. The agent reads the buffer and builds the next portion of the CCT upon each dump. In one embodiment of the present invention, the server waits for the agent while it is doing that, which is a proper solution for a single-processor machine. Another embodiment provides concurrent data processing in the agent on a multi-processor machine, if it is guaranteed that the agent is executed on a different processor.

Note also that the buffer writing code in the server is typically synchronized. Therefore, if we run a multithreaded TA and one thread has caused buffer dump and processing, other threads that call instrumentation will block on the buffer's monitor, waiting for the buffer to become accessible again. To prevent the delays caused by data processing from being attributed to these threads, we use a specially guarded synchronization mechanism. A thread that initiates the buffer dump process sets a special global Boolean flag to true, indicating that the buffer dump is in progress. Another thread, that wants to write an event to the buffer at this time, first checks this flag. If it is true, the thread blocks on the buffer's monitor, and then, upon receiving access to the buffer, records the "adjust time" event for itself. This does not happen if there is enough space in the buffer—an unsuccessful thread would just block on the buffer's monitor for short time needed for the first thread to finish recording an event.

Obtaining Exact Elapsed Time for TA Methods

One consequence of the fact that instrumentation injected into the TA consumes CPU cycles is that, if measures are not taken, the CPU performance data presented to the user may become significantly distorted. It appears that the cost of execution of high resolution timer functions available in Solaris (gethrtime( )) and in Windows NT/2000 (QueryPerformanceCounter( )) is quite high. For example, on a Sun UltraSparc II 450 MHz processor machine running Solaris 2.8, each gethrtime( ) call costs approximately 0.2 microsecond. The cost of QueryPerformancecounter( ) call on Windows seems to be much higher relative to the processor speed. In our experiments, on a 600 MHz Pentium III machine, each such call takes approximately 1.67 microseconds. Many other operations, for example integer arithmetic operations, take much less time.

Therefore, for an average instrumented method, the time spent in instrumentation cannot be ignored if we want to obtain performance measurements that are realistic, as illustrated in FIG. 5. If we ignore the time spent in instrumentation, the time spent in the method that we obtain is equal to $(y_1 + t_{exact} + x_2)$. If $t_{exact}$ is small compared to the other two components, the cost of the method as we measure it will be dominated by the cost of the injected instrumentation. If the number of calls to such a method is high, the obtained results may become misleading, showing that the application spends a large part of its time in this method—whereas in reality this time is spent in instrumentation code.

The simplest way to factor out the time spent in instrumentation so that the final results presented to the user represent only the time spent in the TA itself, is to measure in advance the average time it takes to execute each of the instrumentation methods (calibrate them), and then subtract this value from the rough data. That is why it is so important for these methods to be written such that the cost of their execution is as close to constant as possible. It is also worth noting that on a VM that has a dynamic compiler, the execution time for instrumentation will vary significantly, depending on whether or not this method and other methods that it calls are running interpreted or compiled. To make sure that instrumentation always runs compiled, and thus each call's cost is the same, our calibration procedure, that is performed on the server side every time before starting the TA, executes both methodEntry( ) and methodExit( ) methods for a large number (currently 10,000) of times, measuring the average execution time periodically (for every 100 pairs of calls). It returns the minimal measured result as the final value that will be used in data processing. We describe two techniques to make these measurements. In the first technique, we use a "call graph" or "calling context tree," while in the second technique we use simpler measurement instrumentation.

Using a Call Graph

To obtain the exact time spent in a TA method $t_{exact}$ using this technique, we need to know not just the total time spent in methodEntry( ) and methodExit( ), but the part of this time equal to $(y_1 + x_2)$, which we call "inner time", $t_I$. It appears that in practice we cannot simply assume that this value is a half of the total time—this is generally not true, and for some short methods this assumption can result in, for example, negative calculated "exact" execution time. Fortunately, in our case it is easy to measure the inner time, since both methodEntry( ) and methodExit( ) record the event timestamps. Thus, if we execute a pair of the above calls, without any code between them, for n times, we will get a recorded sequence of n pairs of timestamps: $t_{11}, t_{21}, t_{12}, t_{22}, \ldots, t_{1n}, t_{2n}$. It is clear that the average inner time $t_I$ can be calculated as:

$$t_I = ((t_{21} - t_{11}) + (t_{22} - t_{12}) + \ldots + (t_{2n} - t_{1n}))/n.$$

Note further, that this correction technique cannot be used with an arbitrary form of method CPU time accumulation and presentation. Specifically, if we only measured accumulated time for each method, registering just the time between entering and exiting it, and not taking into account the time spent in methods that it calls, this technique will not compensate for the time spent in instrumentation invoked by this method's callees. In our case, however, we accumulate the profiling results in the form of a CCT (Calling Context Tree), where for each method in each context it is known how many outgoing calls were made. When we build a CCT, we "stop the time" for the caller method, and "start the time" for the callee when processing a method entry event, and do the opposite when processing a method exit event. This way we obtain a "net" elapsed time for the caller method. However, this net time, even after subtracting $t_I$ from it, still remains inexact, because it includes the $x_1$ and $y_2$ components of instrumentation that was invoked by its callees. We call the sum $(x_1 + y_2)$ the "outer time," or $t_O$. Knowing $t_I$ (see above), it is trivial to calculate $t_O$ by subtracting the $t_I$ from the total time involved in the methodEntry( ) and the methodExit( ) functions. Taking into account all the effects of instrumentation that we can predict and measure in advance, the final formula for the exact time for a method that made m direct calls to other methods looks like:

$$t_{exact} = t_{rough} - t_I - m t_O.$$

In order to work correctly, the techniques described herein impose several requirements on the injected code (instrumentation):

1. The time it takes to execute each distinctive packet of code injected into the target application should be constant. That is, the same packet should take the same time to execute no matter what part of the target application it is injected into, or a that moment it is executed.

2. Execution time of the target application code in the presence of instrumentation should be the same as without instrumentation.

3. It should be possible to execute the code that is to be injected into the target application, in isolation.

In practice, it is never possible to satisfy conditions number 1 and 2 for 100 percent of the time. For example, even if the injected code always executes exactly the same sequence of instructions, the underlying OS may still perform its own periodic tasks in parallel with the user code execution, which will inevitably introduce certain deviations in the execution time of the injected code (at least, its "wall clock," or "elapsed," time). However, in practice it is often possible to guarantee that such deviations are small. Thus it is the stability of the execution time of the injected code itself that affects the accuracy of the results obtained using this method, in the first place.

Condition number 2 may not always be true since, for instance, the compiler may use the so-called inlining mechanism for short subroutines of the target application. So, for example, the source Java code that looks like:

```
void m1( ) {
int z= 10;
z= m(z);
}
int m(int x) {
return x * 2;
}
``` will be transformed by the compiler into machine instructions that, if translated back to Java, will look like:

```
void m1( ) {
int z=10;
z=z * 2;
}
```

Inlining may speed up the execution very considerably by eliminating the overhead due to making a call. However, if we inject some additional code into method m( ), it may preclude inlining, since compilers usually inline only methods that are not longer than a certain threshold. If the instrumented version of method m( ) is longer than this threshold, it will not be inlined, and its execution time will increase. In this case, instrumentation indirectly affects (increases) the execution time of the target application. It may be possible to cope with the adverse effects such as this by adjusting the compiler or the runtime environment for the target application, or one may simply ignore such effects if, in practice, they are shown to be not very significant.

Using the Simpler Measurement Technique

The simpler measurement technique comprises the following. Before the target application starts (or even before any application starts on the given machine—this depends on the way in which the particular profiling tool is used), a calibration phase is performed. Calibration means that we simply determine the average time it takes to execute each of the code packets that are then injected into the target application. This time may be small and comparable to the resolution of the timer that we use. Therefore, it makes direct sense to perform a large number—several hundreds or thousands—of executions of these packets, and then divide the resulting total time by the number of executions.

To illustrate how this works, consider a profiling tool that is capable of injecting two different packets of code in the beginning and the end of arbitrary regions of code within the target application. In practice, profiling tools most often allow users to profile whole subroutines this way (i.e. the above region corresponds to a single subroutine, or method), but they may also support profiling arbitrary regions within a subroutine, up to individual source code lines of machine instructions. In any case, the injected code would usually include a pair of packets, which we will denote as "codeEntry( )" and "codeExit( )." They may be two separate subroutines, or just two packets of code that are injected into the target application code "as is." One possible implementation of such a code may look like:

```
static void codeEntry(int methodId) {
methodStartTime[methodId] = getCurrentTime( );
}
static void codeExit(int methodId) {
methodAccumulatedTime[methodId] +=
  getCurrentTIme( ) - methodStarrtTime[methodId];
}
```

In order to calibrate them, we may run, for example, the following code:

```
int nOfEx = 1000; // Number of executions
long startTime = getCurrentTime( );
for (int I=0; I<nOfEx; I++) {
codeEntry(1);
codeExit (1);
}
long endTime=getCurrentTime( );
long totalTime=endTIme−startTime;
double timePerInstrPacketsPair =((double) totalTime)/nOfEx;
```

Note that here we ignore the additional overhead caused by the operations performed on each iteration of the "for" cycle. Typically, this overhead is negligible, since it is due to only a few machine instructions of which this loop construct consists. If, however, we want to achieve an even greater degree of precision, we may put more than one pair of codeEntry( ) and codeExit( ) calls inside the loop, to make this overhead as relatively small as we want (we will also need to adjust the above calculation of timePerInstrPacketsPair accordingly).

timePerInstrPacketsPair—the average time spent in the pair of injected calls (or the time for a single injected call, computed in the same fashion)—is one possible metric for the injected instrumentation code, which is simple to calculate and understand. It is useful in certain situations: for example, we can multiply the above value by the total number of calls to codeEntry( )/codeExit( ) performed during the target application lifetime, and thus obtain the total time spent in the instrumentation. We can then subtract this form the total elapsed execution time for the whole target application, and get the value of the total exact time for it. It is also a perfect metric of any call that is injected within the target application code and is not supposed to measure its performance. An example of this is instrumentation that records events such as memory allocation.

However, this metric is not entirely correct for determining the exact time that the application spends in a particular code region, if it is used in conjunction with instrumentation that itself measures code region execution time, like codeEntry( ) and codeExit( ) above. The time distribution in FIG. 5 illustrates this.

The timing diagram in FIG. 5, illustrates where the time is spent during execution of an application code region with injected codeEntry( ) and codeExit( ) methods. $t_{exact}$ is the time spent in the original target application code, the value that we want to ultimately obtain. $x_1$ is the time elapsed between the start of the codeEntry( ) call execution and the moment when the current time value is obtained, and $y_1$ is the time between this moment and the moment when codeEntry( ) completes. $x_2$ and $y_2$ have the same meaning for codeExit( ). From FIG. 5, we see that the time that the instrumentation actually measures for a given code region is:

$$t_{meas} = y_1 + t_{exact} + x_2$$

Our goal—what we consider the exact time spent in this code region—is to measure $t_{exact}$ which is equal to:

$$t_{exact} = t_{meas} - (y_1 + x_2)$$

Thus, we need to determine the value of $(y_1+x_2)$ to obtain $t_{exact}$. Let us denote this value $t_I$ ("inner time") for short:

$$t_I = y_1 + x_2$$

And thus, $$t_{exact} = t_{meas} - t_I$$

for any target application code region.

Now we describe how we can compute $t_{exact}$ for an arbitrary code region with the help of code instrumentation. To achieve this, we have to impose one additional requirement on this instrumentation (see next paragraph). In practice, we believe, this requirement is usually easy to satisfy.

The value of $t_I$ can be obtained with the help of the codeEntry( ) and codeExit( ) code itself. This instrumentation code may be designed in different ways depending on the goals of a particular profiling tool, and may keep the results that it obtains, in different forms. For example, it may record each timestamp separately in some buffer every time it is called, or it may keep incrementing a limited number of collectors as illustrated in our calibration code example above (in the methodAccumulatedTime array, each element represents accumulated time for an individual method of the target application). Now, we require that this code should ultimately allow us to obtain $t_{AccGross}$, the gross accumulated time spent in the given code region. In our calibration code example, this is straightforward: $t_{AccGrossCalib}$ = methodAccumulatedTime[1]. Now, for this code, it is clear that $t_{meas} = y_1 + x_2$ (see (1)), since there is no code in between codeEntry( ) and codeExit( ) calls in the loop, and thus $t_{exact} = 0$. So, the gross accumulated time obtained during calibration is equal to:

$$t_{AccGrossCalib} = t_{meas} * n_{OfEx} = (y_1 + x_2) * n_{OfEx} = t_I * n_{OfEx}$$

and therefore $$t_I = t_{AccGrossCalib} / n_{OfEx}$$

Once we have measured $t_{AccGrossCalib}$ by running the calibration code such as that presented above, and then calculated the value of $t_I$, we can use "$t_{exact} = t_{meas} - t_I$" from above for any profiled code region of the target application to determine the exact time spent in that code region.

Dynamic Revelation and Instrumentation of a Call Subgraph

As discussed in the introduction, instrumenting a group of methods rather than the whole TA is a very efficient way of reducing profiling overhead when using instrumentation-based profiling. Furthermore, a call subgraph seems to be a very useful criterion for choosing a method group to profile, since it is very easy to specify, and the produced results (CCT and a sorted list of accumulated net times per method) look the same as they would for the whole program and have the same useful properties.

However, it appears that identifying and instrumenting methods within an arbitrary call subgraph of Java methods is not a trivial task. To understand the reasons for that, consider possible ways of performing this operation. If we did not have method hotswapping capabilities in the VM, the only way to instrument a call subgraph would be to determine all methods in it in advance, using static code analysis. We would then instrument all methods in this subgraph (reachable methods, as we will call them) once and forever, either before the application starts or when the VM loads the corresponding classes. Of course, we would be unable to determine methods which the application calls using the Reflection mechanism. As the opposite extreme approach, we could modify the VM such that before making a call, it would check if the current execution thread is presently within the profiled subgraph. If so, the VM would check and instrument, if necessary, the method that is just about to be called.

Unfortunately, these approaches have some drawbacks. We initially implemented the first one, and it turned out that it does not perform well. The first problem is that it cannot follow calls made using reflection. Second, it cannot identify an exact set of virtual method implementations that can be called from an arbitrary virtual call site, unless we use global code flow analysis. The latter is hard to implement, time-consuming, and does not work for objects allocated using reflection (or returned by native methods), whose exact types thus cannot be determined by static analysis of Java code. An alternative, conservative local approach, is when for each virtual call site x.m( ) we consider reachable all implementations of method m( ) in the static type C of object x and all its subtypes. Given that for a Java program we cannot possibly know all of its classes in advance, this means that we have to scan the whole class path, looking for subclasses of C. But the user class path is not all—there are more than 3000 Java core classes, each of which can be used by the application. Thus, in our experiments with realistic applications, we had processing times varying between tens of minutes and more than an hour, due to repeated class path scans. Another problem is that the number of methods that this technique would usually find reachable and instrument was much higher (by a factor of 5 to 10) than the number of methods actually called at run time. All these factors rendered the static approach impractical.

We did not attempt the modification of the VM that would instrument a method just before it is called for the first time. However, we believe that this approach is best suited for simple, interpreted only VMs, where performance would not suffer much, and added complexity would be relatively small. In contrast, in a VM such as HotSpot, this modification would most probably result in both degraded performance and increased complexity of the interpreter and the dynamic compiler, which will be there even when profiling is not used. In effect, we will return to the same mechanism of VM-generated events that we wanted to get rid of.

What we ended up with are two schemes of dynamic identification of the call subgraph, which use local static code analysis and do not require any support from the VM, except for method hotswapping. In the following two subsections, we describe each of these schemes.

Scheme A

In this scheme, we establish the following conditions under which a method m( ) is instrumented: (1) Class C to which m( ) belongs has been loaded by the VM; and (2) Using static code analysis, m( ) is determined to be reachable directly or transitively from the root method.

The actual procedure works as follows:

1. The procedure starts when the subgraph root method's class is loaded (we can intercept this event using the standard class load hook mechanism of the JVM). Suspend the target application and obtain the list of all classes currently loaded by the VM. For each class a special "mirror" data structure is created, that will hold certain information relevant to our analysis. To speed up further analysis, for each class we can also determine and record in the mirror the names of all of its subclasses. Thus, for any given loaded class, all of its subclasses can be obtained instantly. After determining all loaded classes, install our own class load hook that performs operations described in step 3, and resume the TA. Then, for the root method m( ), perform step 2.
2. Scan the bytecodes of method m( ), examining each call instruction. If a call instruction is for a static method SC.s( ), mark this method as "reachable unscanned static" in the SC class mirror. Then check if class SC is currently loaded by the VM. If it is, mark method s( ) as scanned and perform step 2 for it in turn. If a call instruction is for a virtual method VC::v( ), mark this method as "reachable unscanned virtual". Then check if class VC is currently loaded by the VM. If it is, mark the method as scanned and perform step 2 for it. Next, check all of the subclasses of VC that are currently loaded by the VM. If in any of them v( ) is overridden, perform the same procedure for this method, i.e. mark it as scanned and repeat step 2 for it. When this step exhausts, we have a number of methods in loaded classes marked as "reachable scanned" and a number of methods in the mirrors for not yet loaded classes that are marked "reachable unscanned". Now, instrument each scanned method using method hotswapping mechanism, and mark accordingly. Next, step 3 is performed every time a new class is loaded by the VM.

3. Upon loading of a class C, check if a mirror data structure has already been created for this class, and if not, create one. Check if there are any reachable methods in the mirror. If yes, mark each of these methods scanned and perform step 2 for each of them. Next, determine all of C's superclasses. For each superclass, check if it contains any reachable virtual methods. If so, check if any of these methods are overridden in C. Mark each such method as "reachable scanned virtual" and perform step 2 for it.

In one embodiment of the present invention, all bytecode scanning and other code analysis operations are performed at the agent side. The code at the target VM (server) side sends to the agent messages such as "class loaded", "initial list of classes loaded by the VM", etc. and receives messages containing lists of methods to instrument. It is worth noting that once any code has been instrumented and thus CPU profiling started, further code analysis and instrumentation upon class loading, which may be relatively time-consuming, can affect profiling results quite significantly. To prevent this, every time a class load event occurs, our server-side code records a special "thread suspend" profiling event. The "thread resume" event is recorded just before returning from the class load hook to the TA code. This compensates for the time spent in code analysis and instrumentation.

The presented scheme works much better than static code analysis, since only the classes actually loaded by the VM are analyzed, and their number is usually significantly smaller than the number of all classes on the class path. Furthermore, we can easily cope with method invocations via reflection, by instrumenting the code of the java.lang.reflect.Method.invoke( ) method itself. The code that we inject into it maintains a separate dictionary of methods that have been invoked using reflection. Every time Method.invoke( ) is called, it checks if its argument is already in this dictionary. If not, the new method is added to the dictionary, and a special "reflection method invocation" event, accompanied by the new method name, is sent to the agent. This event is handled according to step 2 in the above description.

However, quite often this scheme still does not work very well, that is, this scheme results in a large number of methods instrumented but never called. This happens, in particular, for applications that use GUI libraries, that tend to be highly polymorphic and also, as e.g. in the case of Java Swing classes, seem to have a large number of cross links between classes. Thus, we eventually came up with another scheme, which uses a more lazy approach, presented in the next section.

Scheme B

To overcome the shortcomings of the previous code analysis and instrumentation scheme, we extend the set of conditions necessary for method m( ) to be instrumented. Two new conditions in addition to the first two presented in the previous subsection, are added:

1. Method m1( ) which calls m( ) directly has been instrumented; and
2. Method m1( ) is about to be executed for the first time.

The fact that a method is instrumented only when its chances to be called are good, since its direct caller has been called, reduces the number of methods instrumented unnecessarily quite significantly. However, to make this technique work, the instrumentation in every target application method that has callers, should check, every time it is invoked, whether this is the first invocation of the given method. If so, it should trigger the procedure of instrumentation of its direct callees. Fortunately, this check can be implemented within the same injected methodEntry( ) method that performs CPU time measurements operations, and takes very little time compared to the rest of the instrumentation code. Before instrumentation starts, we allocate a global array of booleans, called methodInvoked[ ], where each element corresponds to a method in the profiled subgraph. During instrumentation, methods that are found reachable are assigned integer identifiers that grow monotonically. Thus, each method is associated with an element of the above array, and to check if an invocation of the given method is the first one, it is sufficient to check if methodInvoked [methodId]== false.

The technique itself works as follows.

1. The procedure starts when the root method's class is loaded (we can intercept this event using a class load hook). Obtain the list of all classes currently loaded by the VM and create mirror data structures in the same way as in Scheme A. Also create an expandable global boolean array methodInvoked [ ] that indicates whether any instrumented method has been invoked at least once.
2. Instrument the root method m( ), and mark it as instrumented in the C's mirror.
3. This step is performed every time any instrumented method m( ) is entered. Check if this method is being executed for the first time. If this is true, perform step 4 for this method.
4. Scan the bytecodes of method m( ), examining each "call" instruction. If a call is for a static method SC::s( ), and method s( ) is not marked as instrumented, mark it as "reachable uninstrumented static" in the SC class mirror. If a call is for a virtual method VC::v( ), and this method is not marked as instrumented, mark it as "reachable uninstrumented virtual" in the VC class mirror. Next, check all subclasses of VC that are currently loaded by the VM. If in any of them v( ) is overridden and not marked as instrumented, also mark it as "reachable uninstrumented virtual". When this step exhausts, we have reached the end of m( ) and marked a number of methods directly reachable from it as "reachable uninstrumented". Now, using the method hotswapping mechanism, instrument those of the above methods that belong to classes, which by this time have already been loaded by the VM.
5. This step is performed by the class load hook, upon loading of any class C. Check if a mirror has already been created for class C, and if not, create one. Next, determine all of the C's superclasses. For each superclass, check if its mirror contains any reachable virtual methods. If so, check if any of these methods are overridden in C. Mark each such method in C as "reachable uninstrumented virtual". Finally, instrument all methods in C marked as "reachable uninstrumented" and mark them as instrumented.

Method Call Graph

Figure 6:
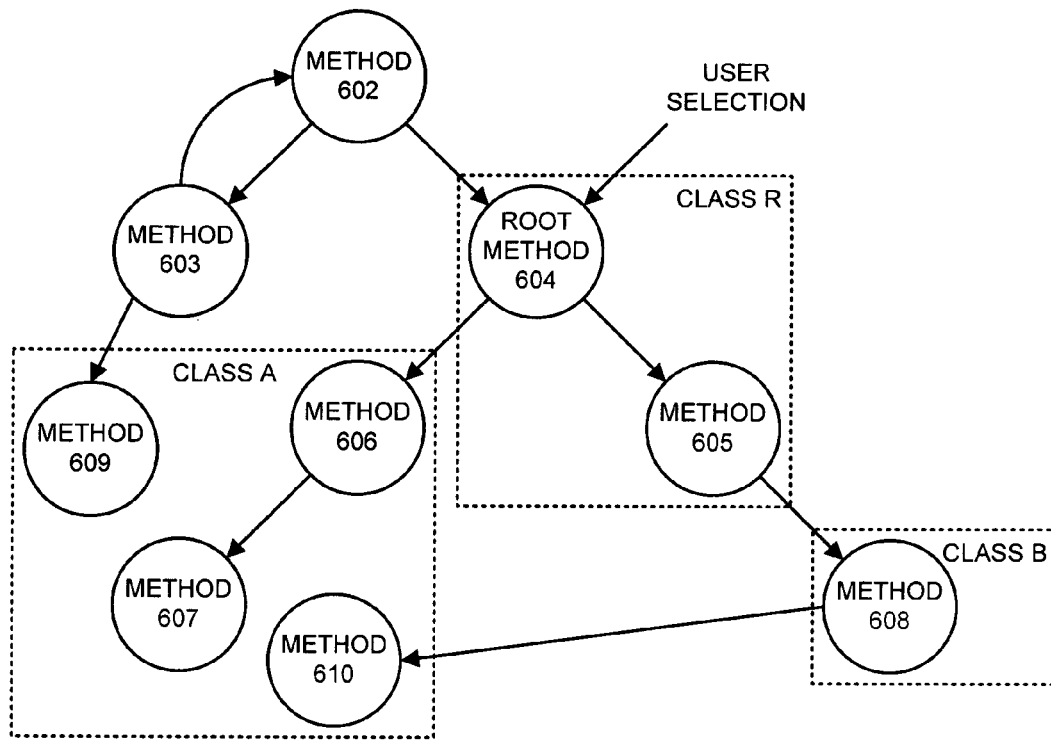
FIG. 6 presents a flow chart illustrating a call graph of methods in accordance with an embodiment of the present invention.

FIG. 6 presents a flow chart illustrating a call graph of methods within a target application in accordance with an embodiment of the present invention. This call graph includes a number of methods 602-610. Method 604 is selected by a user, and becomes a "root method" for profiling purposes. During the profiling process at application runtime, methods that are reachable from the root method are instrumented as they are loaded. For example, when class R is loaded for the first time, root method 604 and method 605 are instrumented.

Next, when class A is loaded, methods 606 and 607, which are reachable from root method 604 are instrumented. On the other hand, method 609, which is not reachable from root method 604, is not instrumented, and method 610 which has not been determined to be reachable yet (because class B has not been loaded), is not instrumented as well.

When class B is subsequently loaded, method 608 is instrumented. Also, method 610, which becomes reachable through method 608 in class B, is instrumented.

Class Mirror Data Structure

Figure 7:
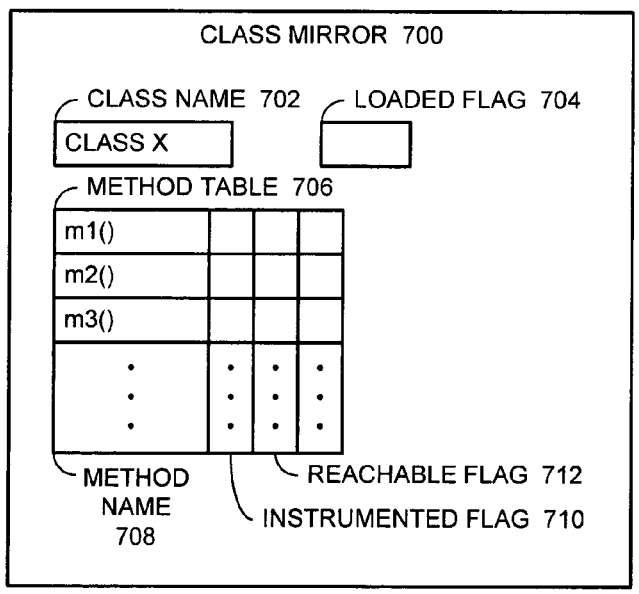
FIG. 7 illustrates a class mirror data structure in accordance with an embodiment of the present invention.

FIG. 7 illustrates a class mirror data structure 700 in accordance with an embodiment of the present invention. Class mirror 700 includes a class name 702 (or some equivalent class identifier) and a loaded flag 704, which indicates whether or not the associated class is presently loaded by the target VM. Class mirror 700 also includes a method table 706, which contains entries for each method in the class. Each of these entries includes a method name 708, as well an instrumented flag 710, which indicates whether the method is presently instrumented. Each entry also includes a "reachable" flag, which indicates whether the method has been determined to be reachable from the root method.

Summary of Instrumentation Process

Figure 8:
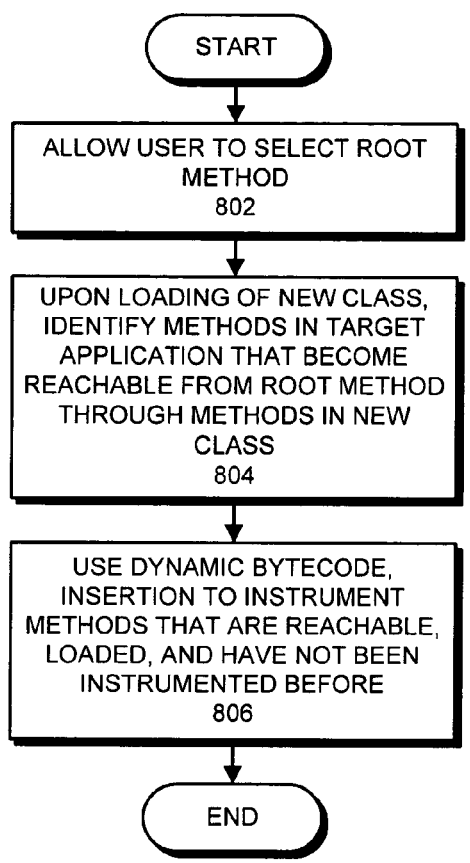
FIG. 8 presents a flow chart illustrating the instrumentation process in accordance with an embodiment of the present invention.

FIG. 8 presents a flow chart illustrating the instrumentation process in accordance with an embodiment of the present invention. The system starts by allowing a user to select a root method within a target application for profiling purposes through some type of user interface (step 802). Next, upon loading of a new class, the system identifies methods in the target application that become reachable from the root method through methods in the new class (step 804). Finally, the system uses dynamic bytecode instruction (or some equivalent technique) to instrument any methods that are reachable, loaded and have not been instrumented before (step 806).

Figure 9:
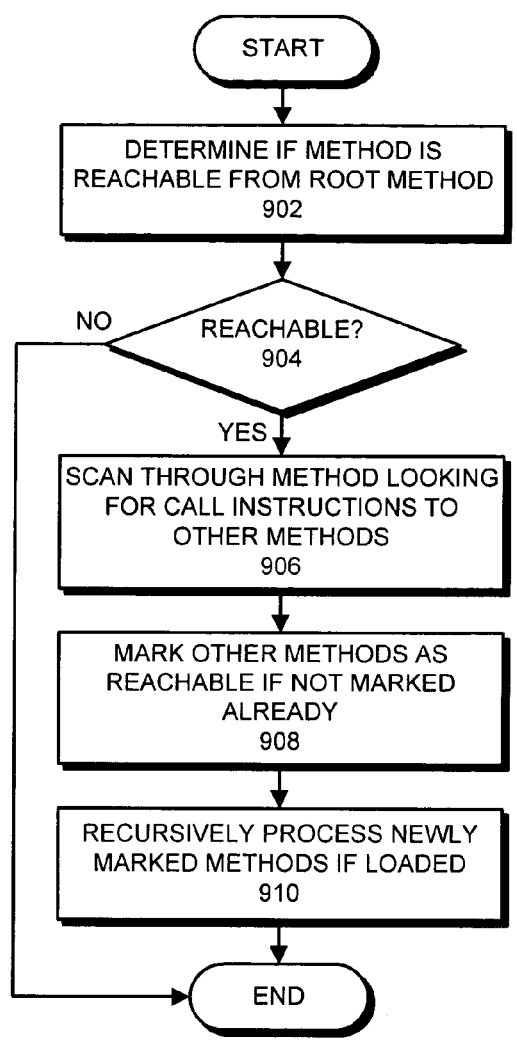
FIG. 9 presents a flow chart illustrating how the system determines whether methods are reachable in accordance with an embodiment of the present invention.

FIG. 9 presents a flow chart illustrating how the system determines whether methods are reachable in accordance with an embodiment of the present invention. This process takes place during step 804 above. When a method is loaded, the system determines if the method has been previously determined to be reachable (step 902). A method can be previously determined to be reachable if it is the root method, or if it is called by a method that has been determined to be a reachable method in a previously loaded class. If the method has not yet been determined to be reachable, the system stops considering the method for the present moment. Otherwise, the system scans through the method looking for call instructions to the other methods (step 906). The system marks these other methods as reachable if they have not been marked as reachable already (step 908). The system then recursively processes these newly marked methods if they are loaded (step 910).

Figure 10:
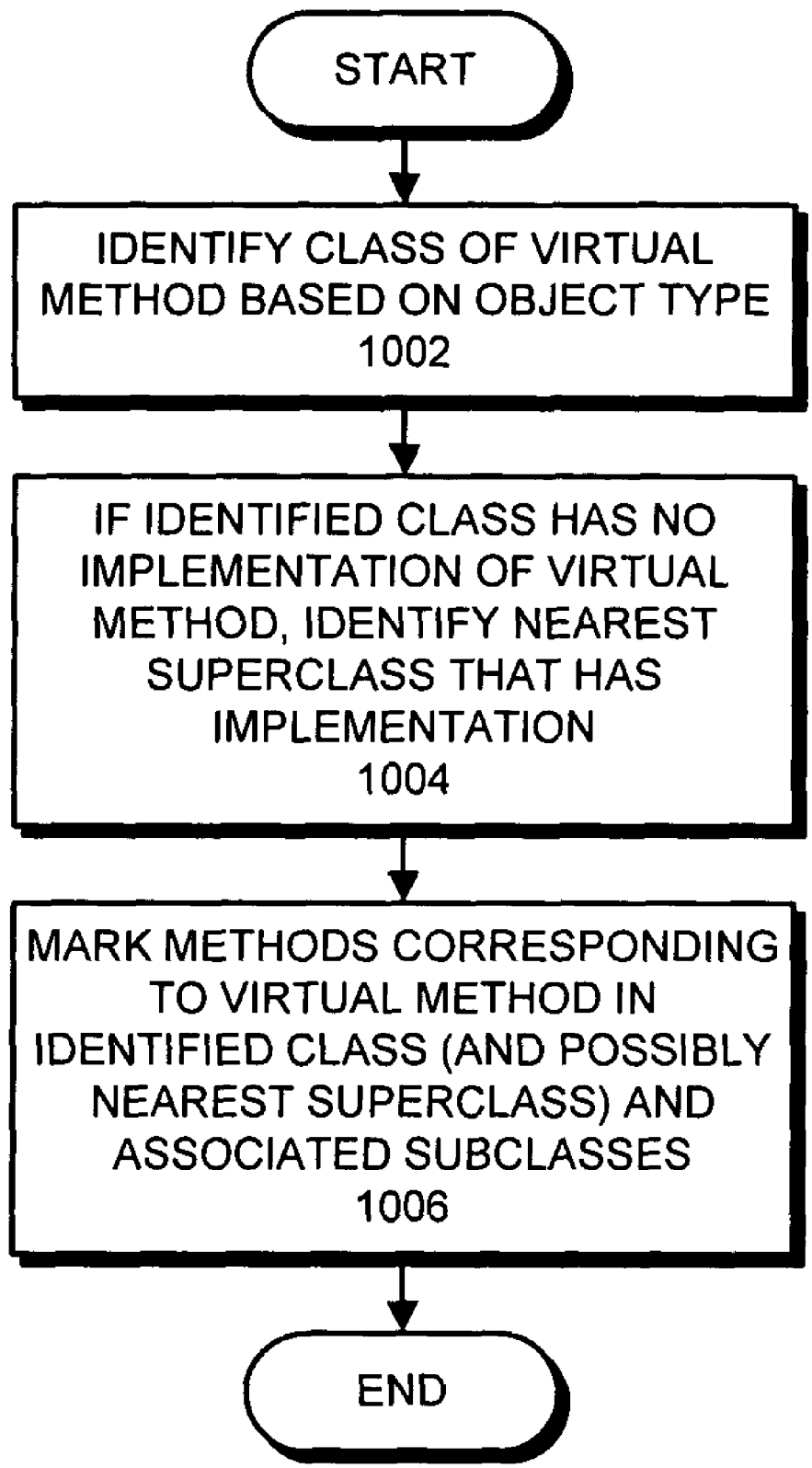
FIG. 10 presents a flow chart illustrating how virtual methods are processed in accordance with an embodiment of the present invention.

FIG. 10 presents a flow chart illustrating how virtual methods are processed in accordance with an embodiment of the present invention. Upon encountering a virtual method in step 804 above, the system identifies a class associated with the virtual method based on an associated object type at the method's call site (step 1002). If the identified class has no implementation of the virtual method, the system identifies the nearest superclass that has an implementation (step 1004). Finally, the system marks methods corresponding to the virtual method in the identified class (or the nearest superclass) along with corresponding methods in any associated subclasses (step 1006).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for dynamically configuring selected methods for instrument-based profiling at run-time, comprising:
   identifying a root method in a target application, wherein only methods that are reachable from the root method during execution of the target application are to be instrumented;
   instrumenting the root method after it is identified, wherein instrumenting the root method involves dynamically patching the root method while the target application is executing;
   upon executing a given instrumented method, determining if the given instrumented method is about to be executed for the first time, and if so, instrumenting methods that,
      are called by the given instrumented method,
      are loaded, and
      have not been instrumented before; and wherein instrumenting the methods involves dynamically patching the methods while the target application is executing.

2. The method of claim 1, wherein identifying the root method involves allowing a user to specify the root method.

3. The method of claim 1, wherein determining if the given instrumented method is about to be executed for the first time involves executing instrumentation code within the given instrumented method, wherein the instrumentation code is executed whenever the given instrumented method is called, and is executed before any other instructions of the given instrumented method are executed.

4. The method of claim 3,
   wherein the instrumentation code checks a global executed-once-or-more flag associated with the given instrumented method, which is initially set to false;
   wherein if the executed-once-or-more flag is false, the instrumentation code knows that the given instrumented method has not been called before, so it performs instrumentation operations as necessary and sets an instrumented once or more flag to true; and
   wherein if the executed-once-or-more flag is true, the instrumentation code does not perform instrumentation operations.

5. The method of claim 1, wherein if a call to a virtual method is encountered in a given instrumented method that is about to be executed for the first time, the method further comprises:
   identifying a class for the virtual method based upon an object type associated with a call site; and
   instrumenting methods corresponding to the virtual method in the identified class and in associated subclasses.

6. The method of claim 5, wherein if the identified class does not have an implementation of the virtual method, the method additionally involves identifying a nearest superclass of the identified class that has an implementation of the virtual method.

7. The method of claim 1, wherein instrumenting a method involves inserting profiling instrumentation code into the method, wherein the profiling instrumentation code includes:
   method entry code that takes a first time measurement at the beginning of a method;
   method exit code that takes a second time measurement at the end of the method; and
   wherein the first and second time measurements are used to calculate an execution time for the method.

8. The method of claim 7, wherein the method entry code determines if the given instrumented method is about to be executed for the first time.

9. The method of claim 1, wherein the tasks of identifying methods and instrumenting methods are performed by a remote profiler client that communicates with a virtual machine executing the target application.

10. The method of claim 1, wherein code that makes up the target application includes platform-independent bytecodes.

11. A computer-readable storage medium storing instructions that when executed by a computer cause the computer to perform a method for dynamically configuring selected methods for instrument-based profiling at run-time, wherein the computer-readable storage medium does not include computer instruction signals embodied in a transmission medium, and wherein the method comprises:
   identifying a root method in a target application, wherein only methods that are reachable from the root method during execution of the target application are to be instrumented;
   instrumenting the root method after it is identified, wherein instrumenting the root method involves dynamically patching the root method while the target application is executing;
   upon executing a given instrumented method, determining if the given instrumented method is about to be executed for the first time, and if so, instrumenting methods that,
      are called by the given instrumented method,
      are loaded, and
      have not been instrumented before; and wherein instrumenting the methods involves dynamically patching the methods while the target application is executing.

12. The computer-readable storage medium of claim 11, wherein identifying the root method involves allowing a user to specify the root method.

13. The computer-readable storage medium of claim 11, wherein determining if the given instrumented method is about to be executed for the first time involves executing instrumentation code within the given instrumented method, wherein the instrumentation code is executed whenever the given instrumented method is called, and is executed before any other instructions of the given instrumented method are executed.

14. The computer-readable storage medium of claim 13,
   wherein the instrumentation code checks a global executed-once-or-more flag associated with the given instrumented method, which is initially set to false;
   wherein if the executed-once-or-more flag is false, the instrumentation code knows that the given instrumented method has not been called before, so it performs instrumentation operations as necessary and sets an instrumented once or more flag to true; and
   wherein if the executed-once-or-more flag is true, the instrumentation code does not perform instrumentation operations.

15. The computer-readable storage medium of claim 11, wherein if a call to a virtual method is encountered in a given instrumented method that is about to be executed for the first time, the method further comprises:
   identifying a class for the virtual method based upon an object type associated with a call site; and
   instrumenting methods corresponding to the virtual method in the identified class and in associated subclasses.

16. The computer-readable storage medium of claim 15, wherein if the identified class does not have an implementation of the virtual method, the method additionally involves identifying a nearest superclass of the identified class that has an implementation of the virtual method.

17. The computer-readable storage medium of claim 11, wherein instrumenting a method involves inserting profiling instrumentation code into the method, wherein the profiling instrumentation code includes:
   method entry code that takes a first time measurement at the beginning of a method;
   method exit code that takes a second time measurement at the end of the method; and
   wherein the first and second time measurements are used to calculate an execution time for the method.

18. The computer-readable storage medium of claim 17, wherein the method entry code determines if the given instrumented method is about to be executed for the first time.

19. The computer-readable storage medium of claim 11, wherein the tasks of identifying methods and instrumenting methods are performed by a remote profiler client that communicates with a virtual machine executing the target application.

20. The computer-readable storage medium of claim 11, wherein code that makes up the target application includes platform-independent bytecodes.

21. An apparatus for dynamically configuring selected methods for instrument-based profiling at run-time, comprising:
   a first circuit within a processor configured to identify a root method in a target application, wherein only methods that are reachable from the root method during execution of the target application are to be instrumented;
   a second circuit within the processor configured to instrument the root method after it is identified, wherein while instrumenting the root method, the second circuit is configured to dynamically patch the root method while the target application is executing;

wherein when a given instrumented method is executed, the second circuit is configured to determine if the given instrumented method is about to be executed for the first time, and if so, to instrument methods that,
are called by the given instrumented method,
are loaded, and
have not been instrumented before; and wherein the second circuit is configured to instrument the methods by dynamically patching the methods while the target application is executing.

22. The apparatus of claim 21, wherein the first circuit is configured to identify the root method by allowing a user to specify the root method.

23. The apparatus of claim 21, wherein while determining if the given instrumented method is about to be executed for the first time, the second circuit is configured to execute instrumentation code within the given instrumented method, wherein the instrumentation code is executed whenever the given instrumented method is called, and is executed before any other instructions of the given instrumented method are executed.

24. The apparatus of claim 23,
wherein the instrumentation code checks a global executed-once-or-more flag associated with the given instrumented method, which is initially set to false;
wherein if the executed-once-or-more flag is false, the instrumentation code knows that the given instrumented method has not been called before, so it performs instrumentation operations as necessary and sets an instrumented once or more flag to true; and
wherein if the executed-once-or-more flag is true, the instrumentation code does not perform instrumentation operations.

25. The apparatus of claim 21, wherein if a call to a virtual method is encountered in a given instrumented method that is about to be executed for the first time, the second circuit is configured to:
identify a class for the virtual method based upon an object type associated with a call site; and to
instrument methods corresponding to the virtual method in the identified class and in associated subclasses.

26. The apparatus of claim 25, wherein if the identified class does not have an implementation of the virtual method, the second circuit is configured to identify a nearest superclass of the identified class that has an implementation of the virtual method.

27. The apparatus of claim 21, wherein the second circuit is configured to instrument a method by inserting profiling instrumentation code into the method, wherein the profiling instrumentation code includes:
method entry code that takes a first time measurement at the beginning of a method;
method exit code that takes a second time measurement at the end of the method; and
wherein the first and second time measurements are used to calculate an execution time for the method.

28. The apparatus of claim 27, wherein the method entry code determines if the given instrumented method is about to be executed for the first time.

29. The apparatus of claim 21, wherein the first circuit and the second circuit are located within a remote profiler client that communicates with a virtual machine executing the target application.

30. The apparatus of claim 21, wherein code that makes up the target application includes platform-independent bytecodes.

* * * * *